United States Patent Office 3,272,786
Patented Sept. 13, 1966

3,272,786
POLYMERIZATION PROCESS USING
CHAIN-TRANSFER AGENTS
Eli Perry, Galveston, Tex., assignor to Monsanto
Company, a corporation of Delaware
No Drawing. Filed Apr. 21, 1961, Ser. No. 104,543
10 Claims. (Cl. 260—88.7)

This application is a continuation-in-part of application Serial No. 742,014 filed June 16, 1958, now abandoned.

The present invention relates to a new process for the polymerization of monomeric organic compounds having ethylennic unsaturation. More particularly, it relates to a process for polymerizing such monomeric compounds to obtain novel low-molecular-weight polymers.

It is well known that vinyl monomers such as styrene, methyl methacrylate, acrylonitrile, vinyl chloride and the like can be polymerized thermally or in the presence of activators, initiators, or catalysts to yield high-molecular-weight materials. Among such catalysts are the organic peroxides such as benzoyl peroxide, acetyl peroxide, tert-butyl peroxide, and the like; certain nitriles such as $\alpha,\alpha'$-azodiisobutyronitrile, $\alpha,\alpha'$-azobis ($\alpha$-methyl) valeronitrile, and the like; and other particular catalysts such as diazosulfones, dialkyl esters of sulpho-dicarboxylic acids or their salts, and the like. Organometallic compounds, too, have been proposed as catalysts for certain vinyl systems in which under the reaction conditions employed, they decompose to yield free radicals. Such a system is exemplified in the use of a tetraalkyllead in the polymerization of vinyl chloride. Certain other organometallic compounds, namely, organo compounds of aluminum have been used as catalysts in the polymerization of ethylene as, for example, in U.S. Patent 2,699,547 issued to Ziegler. In most of the art, however, the polymer products have been characterized by relatively high molecular weights. Attempts to make vinyl polymers of low molecular weight have not been particularly successful. Different techniques have been employed such as polymerization at high temperatures and conducting the polymerization reaction in the presence of a solvent or in the presence of compounds known as "chain-transfer agents" such as mercaptans and chlorohydrocarbons like carbon tetrachloride, bromomethane, and the like. These methods have their shortcomings or disadvantages. The use of high temperatures results in operating difficulties which stem from the considerable increase in the rate of the strongly exothermic polymerization reaction which may result in the reaction occurring violently. Also, control by this method is limited, and the resulting product is nonuniform and often may be discolored. In the solvent dilution method, the proportions of solvent required to effect reduction in molecular weight are quite large and this adds considerably to the cost of the operation. With most of the known transfer agents, "foreign" atoms, i.e., atoms other than carbon and hydrogen, such as oxygen, sulfur, and chlorine which are difficult or impossible to remove subsequent to polymerization must be introduced into the polymer molecule and the types of polymers which can be produced are, consequently, limited.

Now it has been discovered that organometallic compounds act as powerful chain-transfer agents and not as activators or catalysts in the polymerization of vinyl monomers, provided the polymerization is carried out under conditions such that free radicals are generated to initiate the reaction and such free radicals come from a source other than the organo-metallic compound employed. This discovery has made it possible to prepare valuable novel low-molecular-weight polymers from vinyl monomers wherein specific groups are introduced into the polymer chain. For example, a low-molecular-weight polystyrene containing certain desired terminal alkyl groups and having only carbon and hydrogen atoms and no other atoms in the polymer chain can be prepared by polymerizing styrene in the presence of an alkylaluminum compound such as triisobutylaluminum and thereafter hydrolyzing the polymer product. In addition to being able to prepare such pure short-chain products, when the organometallic compounds are employed, there is an additional advantage in that the concentration of these chain-transfer agents often is not depleted since the metal-carbon bond can be continuously regenerated in the process.

It is an object of the present invention, therefore, to provide an improved process for producing low-molecular-weight polymers of unsaturated organic compounds. It is another object of the invention to provide a process for reacting an organometallic compound with one or more units of a polymerizable unsaturated compound. It is a further object of the invention to provide novel low-molecular-weight polymers adapted for specialized uses by virtue of their special physical properties. Other objects and advantages will become apparent from the following description and the appended claims.

According to the invention, polymerizable unsaturated organic compounds are polymerized in the presence of an organometallic compound of the formula $$Me(R)_n$$

wherein Me is a metal chosen from the group consisting of those metals which form organometallic derivatives principally of the d-orbital type or principally of the covalent type and phosphorus and selenium, R may be the same or different and is a hydrocarbon radical such as an aryl, an aliphatic, an alkaryl, or an aralkyl radical or derivatives thereof, and $n$ is the valency of the metal, the polymerization being conducted under such conditions that the organometallic compound is not appreciably decomposed and the free radicals required for initiation of the reaction come from another source such as the monomer itself or a free-radical-type catalyst. A periodic table of the elements marked to indicate the principal types of organometallic derivatives among which are the d-orbital and covalent derivatives is presented in FIGURE 1, page 6, of the textbook, "The Chemistry of Organometallics," by E. G. Rochow et al. (N.Y., John Wiley & Sons, Inc., 1957). Particularly preferred are the principally covalent organometallic compounds corresponding to the above formula, i.e., compounds of metals from the group consisting of aluminum, boron, gallium, indium, zinc, cadmium, mercury, silicon, germanium, tin, lead, antimony and bismuth. Examples of such compounds include diphenylmercury, di-o-tolylmercury, methylethylmercury, di-n-propylzinc, diethylzinc, ethyl-n-propylzinc, diphenylzinc, trimethylboron, triethylboron, tri-t-butylboron, triphenylboron, tri-p-tolylboron, tri-$\alpha$-naphthylboron, tri-n-propylaluminum, tri-isopropylaluminum, triphenylaluminum, tri-p-tolylaluminum, triethylgallium, triphenylgallium, triethylindium, tri-n-nonylindium, triphenylindium, diphenylcadmium, dimethylcadmium, tetramethyltin, tetraethyltin, trimethylethyltin, dimethyltin, dimethyldiethyltin, dimethyl-n-propyltin, tetraphenyltin, phenyltrimethyltin, triphenylmethyltin, phenyltriethyltin, tetramethylgermane, tetrabenzylgermane, trimethylethylsilane, tetramethylsilane, triethylisobutylsilane, tetraethylsilane, diethyldiphenylsilane, methyltriphenylsilane, tetraphenylsilane, tetramethyllead, tetraethyllead, tetraphenyllead, benzyltriphenyllead, diphenyllead, di-isopropyllead, trimethylstibine, triethylstibine, phenyldimethylstibine, triphenylstibine, tetramethyldistibine, tetraethyldistibine, pentaphenylstibine, triethylbismuth, triphenylbismuth, triethylphosphine, triphenylphosphine, dimethylphenylphosphine, methyldiethylphosphine, dimethylselenium, di-n-propylselenium, diphenylselenium, and the like.

It is not a necessary characteristic of the organometallic compound that all the valence bonds of the metal be joined to carbon atoms; only one such carbon-to-metal bond is required, although compounds having more of the bonds are usually more active as chain-transfer agents. For example, compounds such as diisobutoxyisobutylaluminum may be employed but will be less active than, say, triisobutylaluminum. Also, other derivatives of all the organometallic compounds mentioned, i.e., compounds in which the hydrogen of the hydrocarbon groups has been replaced by other substituents such as the halogens, ester groups or ether groups, are useful in the reaction. Instead of diphenylzinc, for example, dichlorophenylzinc may be substituted without any material change in the nature of the reaction, except that the product will contain small amounts of chlorine.

Especially active as chain-transfer agents are the organometallic compounds of the formula

wherein Me is any trivalent metal chosen from those listed above and $R_1$, $R_2$ and $R_3$ may be the same or different monovalent radicals selected from the class consisting of aliphatic and aryl hydrocarbon radicals or derivatives thereof such as alkyl, cycloalkyl-alkyl, cycloalkenyl-alkyl, aryl-alkyl, cycloalkyl, alkylcycloalkyl, arylcycloalkyl, cycloalkyl-alkenyl, aryl, alkylaryl or cycloalkyl-aryl radicals. Specific examples of such radicals include for example, methyl, ethyl, n-propyl, isopropyl, isobutyl, n-amyl, isoamyl, hexyl, n-octyl, n-dodecyl, etc.; cyclopentylmethyl, cyclohexylethyl, methylcyclopentylethyl, and 4-cyclohexenylethyl; 2-phenylethyl, 2-phenylpropyl, β-naphthylethyl, and methylnaphthylethyl; cyclopentyl, cyclohexyl, and 2,2,1-bicycloheptyl; methylcyclopentyl, dimethylcyclopentyl, ethylcyclopentyl, methylcyclohexyl, dimethylcyclohexyl, ethylcyclohexyl, isopropylcyclohexyl, and 5-cyclopentadienyl; phenylcyclopentyl, phenylcyclohexyl, and the corresponding naphthyl derivatives of cycloalkyl groups; phenyl, tolyl, xylyl, ethylphenyl, xenyl, naphthyl, methylnaphthyl, dimethylnaphthyl, ethylnaphthyl, cyclohexylphenyl, and the like. Specific examples of suitable compounds in this class are triisobutylaluminum, trimethylaluminum, trimethylgallium, triethylgallium, tri-n-propylindium, tri(2-phenylethyl)boron, di(cyclopentylmethyl)ethylaluminum, diphenylmethylgallium, methylcyclopentyldiethylboron, tri-α-naphthylboron, triisobutylboron, tribenzylaluminum, tricyclohexylboron, dimethylcyclopentylmethylgallium, and the like.

Unsaturated organic compounds which can be polymerized to yield low-molecular weight polymers in the presence of the above agents include those compounds having the general formula

wherein X is chosen from the group consisting of hydrogen and the halogens, Y is chosen from the group consisting of hydrogen, halogen and the methyl radical, and Z is chosen from the group consisting of halogen, alkyl, aryl, aralkyl, alkaryl, —CN, —COOH, —OH, —CHO, —C—O—R', —COOR', and

R' being chosen from the group consisting or aryl and alkyl radicals. Examples of such compounds are vinyl aromatic compounds such as styrene, ortho-methylstyrene, para-methylstyrene, meta-ethylstyrene, para-isopropylstyrene, ortho-chlorostyrene, para-chlorostyrene, vinyl naphthalene, and the like; vinyl esters such as vinyl acetate, acrylonitrile, methacrylonitrile, methyl acrylate, ethyl acrylate, methyl methacrylate, and the like; acrylic acid; vinyl ketones such as methyl vinyl ketone; halogenated olefins such as vinyl chloride, vinylidene chloride, vinyl fluoride, trichloroethylene, tetrafluoroethylene, and the like. Other unsaturated organic compounds which are suitable include, for example, divinylbenzene, allyl chloride, olefins such as butadiene, 2-chlorobutadiene, and cyanobutadiene; vinyl ethers, isoprene, and maleic anhydride when these latter are in admixture with other monomers with which they copolymerize by free-radical mechanism. The unsaturated organic compounds may be reacted alone or in admixture with each other. When a mixture of monomers is used as the polymerizable component, the resulting product is a low-molecular-weight interpolymer.

The novel products of the reaction may be represented by the general formula

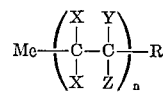

where Me is a metal selected from the group consisting of those metals which form organometallic derivatives principally of the d-orbital type and those which form organometallic derivatives principally of the covalent type and phosphorus and selenium; X may be hydrogen or halogen; Y may be hydrogen, halogen, or a methyl group; Z is a member of the group consisting of halogen, alkyl, aryl, alkaryl, —CN, —OH, —COOH, —CHO, —C—O—R', —COOR', and

R' being chosen from the group consisting of aryl and alkyl radicals; R is a hydrocarbon radical selected from the group consisting of aliphatic, aryl, aralkyl, alkaryl radicals, and derivatives thereof; and n is an integer greater than 1. They contain fragments of the organometallic compound as the terminal atoms attached to recurring units derived from the condensation of the monomer (or monomers in the case of interpolymerization). A given reaction results in a mixture of products which have different molecular weights and which differ in the number of recurring units in the molecule, i.e., the products differ in the numerical value of n. By proper control of the reaction conditions, the average value of n can be controlled so that products of very short chain length, moderate chain length, or long chain length wherein n may vary from 2 to 500,000 can be produced. Compounds wherein n varies from 300 to 15,000 are particularly preferred products.

Other novel polymeric products in addition to those included in the foregoing formula can be obtained readily by hydrolyzing the metal-containing polymerization products of the invention by reacting them with water, an alcohol, or dilute acids or bases. Mere washing with these reagents in many cases effects replacement of the metal fragment in the molecule by hydrogen to yield polymeric products containing only carbon and hydrogen which are counterparts of those represented in the formula above except that the metal in this case is replaced by hydrogen. Typical of such compounds are those of the formula

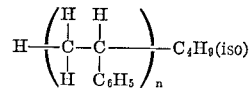

wherein n is an integer from 2 to 20.

The invention is illustrated in the following examples which, however, are not to be construed as limiting it in any manner except as it is limited in the appended claims.

EXAMPLE 1

Approximately 692 ml. (624 g., 6 mol) of freshly distilled styrene was charged under argon to a 1000-ml. polymerization flask fitted with a stirrer and gas inlet and outlet means. Included in the polymerization flask also was a thermowell having an iron-constantan thermocouple and containing approximately 5 ml. of styrene which served as a control sample. To the styrene in the flask there was added 0.168 ml. (0.132 g., 6.666×10⁻⁴ mol) of triisobutylaluminum. The flask was immersed in an oil bath and its contents heated to a temperature of approximately 110° C. for a period of about 4 hours throughout which time it was continuously agitated and an atmosphere of argon was maintained in the flask. Samples were withdrawn at approximately one-hour intervals, a small amount of tert-butyl catechol was added to them to inhibit any further polymerization, and they were cooled after which their indexes of refraction were measured. Simultaneously, the index of refraction of the control sample was determined. Conversion was calculated in each case. The data obtained follow:

| Sample No. | Sample Size (g.) | Refractive Index | | Percent Conv. Sample | Percent Conv. Blank |
|---|---|---|---|---|---|
| | | Sample | Blank | | |
| 1 | 68.4 | 1.5476 | 1.5478 | 7 | 7.5 |
| 2 | 61.0 | 1.5520 | 1.5508 | 16.5 | 14 |
| 3 | 27.1 | 1.5531 | 1.5530 | 18.5 | 18.5 |
| 4 | 56.1 | 1.5554 | 1.5556 | 23.5 | 24 |

Based on the data, the average rate of polymerization or percent conversion per hour was 5.36 for the styrene containing triisobutylaluminum while it was approximately 6.0% per hour for the control sample. It is apparent from the relative rates of polymerization of the two samples that no catalytic effect was exerted by the triisobutylaluminum in this instance.

Samples 1, 2, and 4 were poured into 680, 610, and 560 ml., respectively, of dilute aqueous nitric acid (20:1 $H_2O—HNO_3$) contained in separatory funnels and shaken vigorously. Samples were then saturated with NaCl and allowed to stand overnight. The organic layers were removed and poured into nine times their weight of methanol in separate beakers to precipitate the polymer present. The samples were then placed on a steam bath and digested for an hour or so at a temperature of 50°–60° C. After cooling, the methanol was decanted and the solid polymer samples were allowed to dry in air after which they were further dried in a vacuum oven to constant weight.

Viscosity measurements for each sample were made on 0.100±.001 g. of the dry polymer dissolved in 100 ml. of C.P. toluene at 35.6±0.05° C. From these values, the relative viscosities were calculated and the latter values were employed in calculating the degree of polymerization of each of the samples according to the relationship $$[\eta] = 5.9 \times 10^{-3} \left(\frac{MW}{104}\right)^{0.78}$$

The data obtained are tabulated below together with yields and the equivalent molecular weights.

| Sample No. | Amount (g.) | Degree Polymerization | Molecular Weight |
|---|---|---|---|
| 1 | 33.72 | 1,080 | 112,320 |
| 2 | 35.25 | 1,050 | 109,200 |
| 4 | 37.74 | 1,035 | 107,640 |

EXAMPLE 2

A sample of 700 ml. of styrene was polymerized at the same temperature and in the same manner described in Example 1 except that no triisobutylaluminum was added to the styrene. The average per cent conversion per hour in this instance was calculated to be 7.2%. The first polymer sample taken (i.e., the sample taken after about a one-hour polymerization period) was treated and isolated and a viscosity determination was made on the polymer in the manner described in Example 1. The degree of polymerization, i.e., the number of styrene units in the polymeric product, was calculated from the viscosity data and found to be 1230 as compared to 1080 for the corresponding sample in Example 1 where triisobutylaluminum was employed in the polymerization reaction. The calculated molecular weight of this polystyrene was 127,920 as compared with a calculated average molecular weight of 110,000 for the product from the modified polymerization reaction of Example 1.

EXAMPLE 3

The experiment of Example 1 was repeated except that the temperature of polymerization was maintained at 85° C. The quantities of styrene monomer and triisobutylaluminum used were 671 ml. (605 g., 5.82 mol) and 0.97 ml. (0.762 g., 3.85×10⁻³ mol), respectively. A control run was also made in which 700 ml. of styrene alone was polymerized in the same manner and at the same temperature. After working up and recovering the polymer samples from both runs, viscosity determinations were made in C.P. toluene and the degree of polymerization was calculated in each case. The polymer product obtained with triisobutylaluminum present during the polymerization reaction had an average composition of 132 styrene units whereas that obtained without this chain-transfer agent present had an average composition of 1950 styrene units.

EXAMPLE 4

About 14–15 ml. of triisobutylaluminum was added to 500 ml. of water-free benzene and this mixture was charged to a one-liter polymerization flask. Styrene (130 ml.) was added to the flask and the resulting mixture was heated in an oil bath and maintained at a temperature of 80° C. for about 26 hours. At the end of the polymerization period, the reaction mixture was cooled and a solution consisting of 30 ml. of concentrated $HNO_3$ in 250 ml. of water which had been degassed to remove all traces of oxygen was added to it. The contents of the polymerization flask were poured into a separatory funnel, saturated with salt, and allowed to stand overnight. The water layer was decanted and the organic layer was filtered into a distillation flask.

The organic material was distilled at atmospheric pressure then under vacuum to remove benzene, styrene, and small amounts of ethylbenzene. The pot residue was distilled with steam to remove all traces of styrene. The residue from this distillation was fractionated to yield three fractions of polystyrene which were analyzed and found to have the following properties:

Fraction 1 collected at an overhead temperature of 200–230° C. at 1–2 mm. of Hg was a thin liquid at 25° C. and at 0° C., contained 3 to 4 styrene units per isobutyl group, had an average molecular weight of about 425, and an index of refraction at 25° C. of 1.5537.

Fraction 2 collected at a pot temperature of 235–275° C. at 0.4–0.5 mm. of Hg was a light oil at 25° C., a viscous liquid at 0° C., contained 5 styrene units per isobutyl group, had an average molecular weight of 577 and an index of refraction at 25° C. of 1.5667.

Fraction 3 collected at a pot temperature of 275–330° C. at 0.5–0.8 mm. of Hg was a viscous liquid at 25° C. and a solid at 0° C., contained 7.5 styrene units per isobutyl group, had an average molecular weight of 837 and an index of refraction at 25° C. of 1.5776.

In addition to a C/H analysis the polymers were subjected to infrared analysis. None of them showed significant amounts of carbonyls, ethers, or hydroxyl groups in the infrared. The infrared spectrum of the fractions was identical with that of polystyrene over the 2 to 23μ range except for the indication of the isobutyl groups. The presence of the isobutyl groups was confirmed by proton N.M.R. studies. Less than 10% of the chains contained a double bond as determined by bromine absorption. The aluminum content of the purified polymer samples was less than one part per million.

EXAMPLE 5

A series of experiments was conducted with styrene using different organometallic compounds as chain-transfer agents. The styrene monomer (25 ml.) and chain-transfer agent were charged to a drawn-out 25 x 200-mm. test tube under an atmosphere of argon. The contents of the tube were frozen in Dry Ice and the tube was sealed off under vacuum. The tube was then allowed to warm up until the contents had thawed, then it was placed in a wire basket and set in an oil bath maintained at 100° C. After a period of about 3.5 hours in the bath, the tube was removed, cooled in ice water, and its contents frozen by immersion in Dry Ice. The tube was then broken open and its contents allowed to thaw. The contents of the tube was poured into 250 ml. of methanol made acidic with $HNO_3$. The resulting suspension was filtered. The precipitated polymer was air-dried and then oven-dried at 60° C. under vacuum to constant weight. The degree of polymerization of the samples was calculated from viscosity measurements made on 0.1 g. samples in 100 ml. of C.P. toluene. Control samples containing only styrene were included in the series. Results recorded in Table I effectively demonstrate the action of the organometallic compounds as chain-transfer agents in styrene polymerization.

*Table I.—Polymerization of styrene with various organometallic compounds*

| Run No. | Organometallic Compound | Amount of Organometallic Compound Added (g.) | Degree of Polymerization (n) |
| --- | --- | --- | --- |
| | None | | 1,600 |
| | $Al(C_2H_5)_3$ | 0.0243 | 83 |
| | $Al(C_2H_5)_2Cl$ | 0.0258 | 26 |
| 19 | None | | 1,532 |
| 18 | $(C_4H_9)_3B$ | 0.020 | 1,001 |
| 29 | None | | 1,563 |
| 26 | $(C_4H_9)_3P$ | 0.31 | 519 |
| 58 | None | | 1,475 |
| 53 | $(C_2H_5)_4Si$ | 0.48 | 1,302 |
| 58 | None | | 1,475 |
| 56 | $(C_2H_5)_4Pb$ | 6.2 | 988 |
| 144 | $(C_4H_9)_4Pb$ | 1.7 | 1,228 |
| 55 | $(C_4H_9)_3Sb$ | 1.5 | 982 |
| 68 | None | | 1,654 |
| 64 | $(C_4H_9)_2Cd$ | 0.57 | 269 |
| 77 | None | | 1,514 |
| 71 | $(C_6H_5)_4Sn$ | 2.6 | 1,327 |
| 91 | None | | 1,593 |
| 87 | $(C_6H_5)_3Sb$ | 1.2 | 1,404 |
| 89 | $(C_6H_5)_3Bi$ | 0.75 | 1,413 |
| 130 | None | | 1,587 |
| 117 | $(C_4H_9)_4Sn$ | 0.64 | 1,476 |
| 143 | None | | 1,508 |
| 139 | $(C_2H_5)_2Zn$ | 0.32 | 115 |
| 133 | $(C_2H_5)_2Hg$ | 4.5 | 1,471 |
| 152 | None | | 1,486 |
| 151 | $(C_2H_5)_3In$ | 1.4 | 92 |

EXAMPLE 6

To each of two separate flasks previously purged with argon, there were charged under an atmosphere of argon 11-ml. samples of freshly distilled methyl methacrylate. About 0.2 ml. of triisobutylaluminum was added to one of these and, after thorough mixing, the mixture was allowed to stand for 10 minutes. Then 0.01 g. of $\alpha,\alpha'$-azodiisobutyronitrile was added to the mixture. The same amount of $\alpha,\alpha'$-azodiisobutyronitrile was added to the monomer in the second flask. Both flasks were immersed in an oil bath and their contents heated to approximately 60° C. The monomer in both containers was maintained at this temperature for approximately one hour. At the end of this time, the contents of the flasks were poured into methanol in separate containers at a temperature of 0° C. to precipitate the polymer and the resulting suspensions were filtered. The precipitated polymer was washed with methanol at 0° C., dried in air, and then dried in a vacuum oven at approximately 60° C. to constant weight.

The viscosity of a sample of $0.100 \pm 0.001$ g. of each of the dry polymers dissolved in 100 ml. of benzene was determined. From these values, the relative viscosities and subsequently the degree of polymerization of the methyl methacrylate was calculated. The formula used for conversion of intrinsic viscosity to degree of polymerization was $$P_n = 2.22 \times 10^3 [\eta]^{\frac{1}{0.76}}$$

The methyl methacrylate polymer made in the presence of the triisobutylaluminum had an average composition of 500 methyl methacrylate units whereas that produced in the system where the organometallic chain-transfer agent was not used had an average composition of 28,000 methyl methacrylate units.

EXAMPLE 7

Following essentially the procedure outlined in Example 5, methyl methacrylate was polymerized in a series of experiments at 60° C. using $\alpha,\alpha'$-azodiisobutyronitrile (0.01% by weight) as a catalyst and different organometallic compounds as chain-transfer agents. The catalyst was introduced first into the drawn-out polymerization tubes as a solution in benzene. The benzene was pumped off under about 45 mm. Hg pressure and the tubes were then purged with argon just before the monomer and organometallic compound were charged thereto. The precipitating medium was 90–10 water-methanol. As in Example 6, control samples containing only methyl methacrylate and azodiisobutyronitrile were included in the series. Results of these experiments are recorded in Table II.

*Table II.—Polymerization of methyl methacrylate with various organometallic compounds*

| Run No. | Organometallic Compound | Amount of Organometallic Compound Added (g.) | Degree of Polymerization (n) |
| --- | --- | --- | --- |
| 19 | None | | 13,150 |
| 13 | $(C_2H_5)_4Si$ | 0.29 | 10,960 |
| 29 | None | | 12,650 |
| 21 | $(C_4H_9)_3P$ | 0.500 | 8,650 |
| 22 | $(C_4H_9)_3P$ | 1.00 | 7,100 |
| 26 | $(C_6H_5)_3P$ | 0.37 | 12,250 |
| 45 | None | | 12,800 |
| 33 | $(C_2H_5)_3Al$ | 0.28 | 585 |
| 35 | $(C_2H_5)_3Al$ | 0.56 | 305 |
| 36 | $(C_2H_5)_3Al$ | 1.14 | 180 |
| 58 | None | | 12,700 |
| 54 | $(C_4H_9)_3Sb$ | 2.3 | 10,550 |
| 68 | None | | 12,620 |
| 64 | $(C_4H_9)_3B$ | 0.28 | 6,384 |
| 75 | None | | 12,850 |
| 73 | $(C_2H_5)_2Hg$ | 8.6 | 10,680 |
| 75 | None | | 12,850 |
| 78 | $(C_2H_5)_3In$ | 0.15 | 6,234 |
| 63 | $(C_4H_9)_4Pb$ | 4.2 | 11,100 |
| 85 | None | | 13,660 |
| 82 | $(C_6H_5)_3Bi$ | 0.20 | 10,360 |

EXAMPLE 8

The solution polymerization of acrylonitrile both with and without an organometallic chain-transfer agent was carried out as follows:

About 50 ml. of benzene was charged to a control flask under an atmosphere of argon. To this, while still maintaining the argon atmosphere, was added 10 ml. of acrylonitrile and 0.1004 g. of $\alpha,\alpha'$-azodiisobutyronitrile. Twenty-five ml. of the solution from the control flask was removed and transferred to an experimental flask and 0.02 ml. of triisobutylaluminum was added to the solution in the experimental flask. Both flasks were placed in an oil bath and heated to a temperature of about 50° C. for a period of about 1 hour. At the end of that time, the flasks were removed from the bath and set in Dry Ice to cool.

The contents of the flasks were poured into separate beakers each containing 250 ml. of methanol to which a few drops of nitric acid had been added to make the solution slightly acidic. The mixtures were stirred thoroughly and allowed to stand until the solids had separated. The supernatant liquid was decanted and another 100 ml. of methanol were added to each sample. The samples were filtered and placed in jars to air dry, after which they were dried to constant weight in a vacuum oven at 60° C.

The viscosity of 0.1-g. samples of each of the polyacrylonitriles dissolved in 100 ml. of dimethylformamide was determined and the degree of polymerization of each was calculated from the measurements made. To convert from intrinsic viscosity to degree of polymerization, the formula $[\eta]=5.74\times10^{-4}(53P)^{0.733}$ was used. The polyacrylonitrile prepared in the presence of triisobutylaluminum had an average composition of 950 acrylonitrile units while that prepared without any of the organometallic compound present contained 1600 acrylonitrile units.

EXAMPLE 9

A number of samples of acrylonitrile were polymerized at 60° C. both in the absence and in the presence of various organometallic compounds following the general procedure described in Example 5 above and using $\alpha,\alpha'$-azodiisobutyronitrile as catalyst for the polymerization in all cases. Dimethylformamide was used as a solvent to prevent precipitation of the polymer as it formed. Results of the series of polymerizations are presented in Table III. It is evident from a comparison of the molecular weights of the polymers produced when varying amounts of the different organometallic compounds were used with those made without any organometallic compound present that all the organometallic compounds, while they vary in degree of effectiveness, are effective chain-transfer agents.

*Table III.—Polymerization of acrylonitrile with various organometallic compounds*

| Run No. | Organometallic Compound | Amount of Organometallic Compound Added (g.) | Degree of Polymerization (n) |
|---|---|---|---|
| 19 | None | | 481 |
| 11 | $(C_4H_9)_2Cd$ | 0.80 | 18.7 |
| 24 | $(C_2H_5)_3Al$ | 0.23 | 400 |
| 33 | $(C_4H_9)_3Sb$ | 0.15 | 55 |
| 31 | None | | 478 |
| 54 | None | | 473 |
| 51 | $(C_4H_9)_3B$ | 0.92 | 104 |
| 80 | $(C_2H_5)_3In$ | 0.29 | 322 |
| 29 | $(C_2H_5)_4Si$ | 1.9 | 390 |
| 40 | $(C_4H_9)_4Sn$ | 8.0 | 328 |
| 57 | $(C_2H_5)_4Pb$ | 8.5 | 263 |
| 69 | $(C_6H_5)_3Sb$ | 0.17 | 316 |
| 67 | None | | 477 |
| 64 | $(C_2H_5)_2Zn$ | 0.95 | 128 |
| 65 | $(C_2H_5)_2Zn$ | 1.8 | 11.2 |
| 67 | None | | 477 |
| 62 | $(C_2H_5)_2Hg$ | 12 | 330 |
| 63 | $(C_2H_5)_2Hg$ | 18 | 287 |
| 82 | None | | 496 |
| 75 | $(C_4H_9)_3As$ | 0.15 | 461 |

The exact procedure to be used for polymerization will vary with the properties of the monomer employed. The polymerization reaction may be carried out thermally or with the aid of a catalyst. The catalytic polymerization of vinyl compounds with free-radical-type catalysts is so well known that anyone skilled in the art will be able without difficulty to select a suitable catalyst. It is understood, of course, that the catalyst employed must be one which does not react with the organometallic compound used as the chain-transfer agent. By way of example, the following suitable catalysts are mentioned: peroxygen compounds, for example, diacyl peroxides such as acetyl peroxide, benzoyl peroxide, lauroyl peroxide, and alkali and ammonium persulfates, perborates and percarbonates; molecular oxygen; amine oxides such as trimethylamine oxide, triethylamine oxide, and dimethylamine oxide; azonitriles such as $\alpha,\alpha'$-azodiisobutyronitrile, $\alpha,\alpha'$-azodi-($\alpha$-ethyl)butyronitrile and $\alpha,\alpha'$-azodi-($\alpha$-cyclohexyl)propionitrile; hydrazine salts such as hydrazinedihydrochloride and hydrazine sebacate; ultraviolet light; and other peroxides such as hydrogen peroxide, diethyl peroxide, cyclohexanone peroxide and the like. The amount of catalyst used generally varies from about 0.001% to about 10% by weight of the monomer to be polymerized.

The polymerization reaction can be carried out over a wide range of temperatures from below room temperature (approx. $-100°$ C.) to over 250° C. The preferred temperature for any given polymerization depends upon the nature of the monomer itself, the particular catalyst used, if any, and the organometallic agent employed as the chain-transfer agent. For the majority of cases, the preferred temperature lies in the range from about 25° to 200° C. The upper limit of temperature in individual cases is the decomposition temperature of the organometallic agent employed. Any appreciable decomposition of the organometallic compound must be avoided if it is to be effective as a chain-transfer agent.

The process may be conducted at atmospheric pressure but superatmospheric pressures and subatmospheric pressures may also be employed. Pressures as high as 2000 atmospheres can be used and the ultimate pressure limit for the reaction is set only by the limitations of the available equipment. The preferred pressure range for the majority of the reactions of the present invention is 1–50 atmospheres.

The concentration of organometallic compound in the polymerization process can also be varied over very wide limits. In general, an increase in the concentration of the organometallic compound in relation to the monomer produces a decrease in the average molecular weight of the product. Also, the average chain length of the polymer product in a given reaction is a function of the concentration of monomer and depends, too, on the nature of the chain-transfer agent employed, some of the organometallic agents being more active than others. The preferred concentration of the organometallic compound will thus depend upon the nature of the reactants and the chain length of the polymeric product desired but will generally be in the range from about 0.0001% to about 50% by weight of the monomer. Concentrations as high as 100% or more are also useful depending upon the end-product desired.

Since the reaction is an exothermic one, it may be conducted if desired, in the presence of an inert diluent which will act to absorb some of the heat. Preferably, inert organic solvents are employed although water is a suitable and satisfactory diluent in cases where the organometallic compound employed is not attacked by it. Suitable diluents include, for example, low-boiling liquids which are relatively inert under the reaction conditions such as aliphatic hydrocarbons, cycloaliphatic hydrocarbons, aromatic hydrocarbons, aliphatic ethers, and cycloaliphatic ethers. This technique is similar to that commonly referred to as solution polymerization whereas polymerization in the absence of any diluents parallels so-called bulk or mass polymerization. The process of the invention can also be conducted under conditions similar to emulsion polymerization in those instances where the organometallic chain-transfer agent used is not reactive with water. In this case, the usual surface-active agents are employed together with vigorous agitation to disperse the reactants in the aqueous system and insure their intimate contact throughout the reaction period. The optimum pH of the reaction mixture is generally determined by the surface-active agent and catalyst employed for a given system.

Operation may be batchwise or on a continuous basis. All of the reactants may be charged simultaneously or the organometallic compound may be pre-mixed with the monomer, or in some cases it may be desirable to add monomer or the organometallic compound to the system as the reaction progresses. Frequently, when a catalyst is employed, the reaction may be more effectively controlled by adding the catalyst to the system in portions or in a slow continuous fashion as the reaction progresses. This can be done by injecting a solution of the catalyst in the monomer or in an inert solvent. In a continuous system, for example, a mixture of the vinyl monomer, the organometallic chain-transfer agent, and the catalyst, if one is used, can be passed continuously through a reaction zone maintained under polymerization conditions. Alternatively, the catalyst can be injected into the system of the monomer and organometallic compound which is passing through the reaction zone. In some cases it is advantageous to add one of the reactants to the mixture in the reaction zone so as to offset any marked change in concentration in one of the reactants which might occur due to the rate of the reaction. Continuous operation facilitates control of the reaction and is usually more flexible than batch operation.

Some organometallic compounds are sensitive to oxygen, carbon dioxide, moisture and the like and are decomposed thereby. Thus, while oxygen in small concentrations can act as a catalyst in the vinyl polymerization reaction, its presence in any substantial quantity should be avoided when these particular oxygen-sensitive organometallic compounds are used. It is preferable to keep the oxygen content of the reaction system at an absolute minimum and the reaction is, therefore, best conducted under an atmosphere of an inert gas such as nitrogen, argon, methane, and the like.

The polymeric products of the invention contain small amounts of the metal of the organometallic compound used as the modifier or chain-transfer agent in the polymerization. The presence of the metal frequently adds valuable properties to the polymer such as stability against degradation by light or heat, for example. However, should it be desirable for certain purposes to obtain a polymer containing only carbon and hydrogen, the bound metals are easily and simply removed as mentioned above by washing with water, alcohol, acid, or caustic solutions. Residual aluminum and bismuth, for instance, are removed by treatment with a dilute acid such as nitric acid.

The products of the invention find many and varied uses depending upon their chemical constitution. Among other things, the low-molecular-weight products may, depending upon the average chain length, be used as solvents, as lubricant additives, as organic coolants for atomic reactors, as low-molecular-weight polymers having exceptional heat stability resulting from "built-in" stabilizers, i.e., metals, and so forth.

What is claimed is:

1. Compounds of the formula

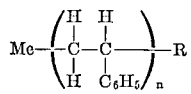

wherein Me is chosen from the group consisting of aluminum, boron, gallium, indium, zinc, cadmium, mercury, silicon, germanium, tin, lead, antimony, and bismuth; X is a member of the group consisting of hydrogen and halogen; Y is chosen from the group consisting of hydrogen, halogen, and the methyl radical; Z is chosen from the group consisting of halogen, aryl, aralkyl, alkaryl, —CN, —COOH, —C—O—R′, and

radicals, R′ being an alkyl radical; R is chosen from the group consisting of alkyl, aryl, aralkyl, and alkaryl hydrocarbon radicals; and $n$ is an integer from 2 to 500,000.

2. Compounds of the formula

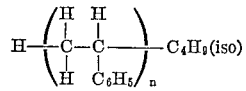

wherein Me is chosen from the group consisting of aluminum, boron, gallium, indium, zinc, cadmium, mercury, silicon, germanium, tin, lead, antimony, and bismuth; R is chosen from the group consisting of alkyl, aryl, aralkyl, and alkaryl hydrocarbon radicals; and $n$ is an integer from about 2 to 500,000.

3. Compounds of the formula

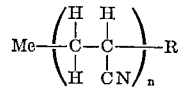

wherein $n$ is an integer from 2 to 20.

4. Compounds of the formula

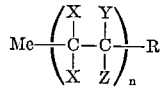

wherein Me is chosen from the group consisting of aluminum, boron, gallium, indium, zinc, cadmium, mercury, silicon, germanium, tin, lead, antimony, and bismuth; R is chosen from the group consisting of alkyl, aryl, aralkyl, and alkaryl hydrocarbon radicals; and $n$ is an integer from about 2 to 500,000.

5. A process for preparing compounds of the formula recited in claim 1 which comprises polymerizing an organic compound of the formula

wherein X is chosen from the group consisting of hydrogen and the halogens; Y is chosen from the group consisting of hydrogen, halogen, and the methyl radical; and Z is chosen from the group consisting of halogen, aryl, aralkyl, alkaryl, —CN, —COOH, —C—O—R′, and

radicals, R′ being an alkyl radical, in the presence of from about 0.0001% to about 50% by weight of said organic compound of an organometallic compound of the formula $Me(R)_n$ wherein Me is a metal chosen from the group consisting of aluminum, boron, gallium, indium, zinc, cadmium, mercury, silicon, germanium, tin, lead, antimony, and bismuth, R is chosen from the group consisting of alkyl, aryl, aralkyl, and alkaryl hydrocarbon radicals, and $n$ is the valence of the metal, said polymerization being effected at a temperature at which said polymerizable organic compound yields free radicals but below that at which said organometallic compound decomposes appreciably to yield free radicals.

6. A process for preparing compounds of the formula recited in claim 1 which comprises polymerizing an organic compound of the formula

wherein X is chosen from the group consisting of hydrogen and the halogens; Y is chosen from the group consisting of hydrogen, halogen, and the methyl radical; and Z is chosen from the group consisting of halogen, aryl, aralkyl, alkaryl, —CN, —COOH, —C—O—R′, and

radicals, R′ being an alkyl radical, in the presence of from about 0.001% to about 10% by weight of said organic of a free-radical-generating compound and from about 0.0001% to about 50% by weight of said organic compound of an organometallic compound of the formula $Me(R)_n$ wherein Me is a metal chosen from the group consisting of aluminum, boron, gallium, indium, zinc, cadmium, mercury, silicon, germanium, tin, lead, antimony, and bismuth, R is chosen from the group consisting of alkyl, aryl, aralkyl and alkaryl hydrocarbon radicals, and $n$ is the valence of the metal, said polymerization being effected at a temperature at which said free-radical-generating compound decomposes but below that at which said organometallic compound decomposes appreciably to yield free radicals.

7. A process for preparing compounds of the formula recited in claim 2 which comprises polymerizing styrene in the presence of from about 0.0001% to about 50% by weight of said styrene of an organometallic compound of the formula $Me(R)_n$ wherein Me is a metal chosen frome the group consisting of aluminum, boron, gallium, indium, zinc, cadmium, mercury, silicon, germanium, tin, lead, antimony and bismuth, R is chosen from the group consisting of alkyl, aryl, aralkyl, and alkaryl hydrocarbon radicals, and $n$ is the valence of the metal, said polymerization being effected at a temperature at which said styrene yields free radicals but below that at which said organometallic compound decomposes appreciably to yield free radicals.

8. A process for preparing compounds of the formula recited in claim 2 which comprises polymerizing styrene in the presence of from about 0.001% to about 10% by weight of said sytrene of a free-radical-generating compound and from about 0.0001% to about 50% by weight of said styrene of an organometallic compound of the formula $Me(R)_n$ wherein Me is a metal chosen from the group consisting of aluminum, boron, gallium, indium, zinc, cadmium, mercury, silicon, germanium, tin, lead, antimony, and bismuth, R is chosen from the group consisting of alkyl, aryl, aralkyl, and alkaryl hydrocarbon radicals, and $n$ is the valence of the metal, said polymerization being effected at a temperature at which said free-radical-generating compound decomposes but below that at which said organometallic compound decomposes appreciably to yield free radicals.

9. A process for preparing compounds of the formula recited in claim 3 which comprises polymerizing styrene in the presence of from about 0.0001% to about 50% by weight of said styrene of triisobutylaluminum and from about 0.001% to about 10% by weight of said styrene of $\alpha,\alpha'$-azodiisobutyronitrile at a temperature in the range of from about 20°–180° C., subjecting the resulting polymeric product to hydrolysis by mixing with an excess of a dilute aqueous mineral acid, saturating the resulting solution with salt to separate the aqueous and organic phases, precipitating the polystyrene product by pouring said organic phase into an excess of methanol and recovering said polystyrene product by filtration.

10. A process for preparing compounds of the formula recited in claim 4 which comprises polymerizing acrylonitrile in the presence of from about 0.001% to about 10% by weight of said acrylonitrile of a free-radical-generating compound and from about 0.0001% to about 5% by weight of said acrylonitrile an organometallic compound of the formula $Me(R)_n$ wherein Me is a metal chosen from the group consisting of aluminum, boron, gallium, indium, zinc, cadmium, mercury, silicon, germanium, tin, lead, antimony and bismuth, R is chosen from the group consisting of alkyl, aryl, aralkyl and alkaryl hydrocarbon radicals, and $n$ is the valence of the metal, said polymerization being effected at a temperature at which said free-radical-generating compound decomposes but below that at which said organometallic compound decomposes appreciably to yield free radicals.

References Cited by the Examiner
UNITED STATES PATENTS

| | | | |
|---|---|---|---|
| 2,833,741 | 5/1958 | Lal | 260—89.5 |
| 2,868,772 | 1/1959 | Ray et al. | 260—94.9 |

OTHER REFERENCES

Furukawa et al.: J. of Pol. Sci., Vol. 28, February 1958, pp. 227–229.

Ziegler: Angewandte Chemie, vol. 68, (1956), pp. 721–729.

JOSEPH L. SCHOFER, *Primary Examiner.*

HAROLD BURSTEIN, LEON J. BERCOVITZ,
*Examiners.*

H. WONG, *Assistant Examiner.*

UNITED STATES PATENT OFFICE
CERTIFICATE OF CORRECTION

Patent No. 3,272,786                              September 13, 1966

Eli Perry

It is hereby certified that error appears in the above numbered patent requiring correction and that the said Letters Patent should read as corrected below.

Column 1, line 14, for "ethylennic" read -- ethylenic --; column 7, line 66, for "0.01" read -- 0.001 --; column 9, in TABLE III, under the sub-heading "Degree of Polymerization (n)", line 10 thereof, for "328" read -- 382 --; column 13, line 1, befor "of" insert -- compound --; column 14, line 17, for "5%" read -- 50% --; same line 17, after "acrylonitrile" insert -- of --.

Signed and sealed this 24th day of October 1967.

(SEAL)
Attest:

Edward M. Fletcher, Jr.                              EDWARD J. BRENNER

Attesting Officer                                        Commissioner of Patents